United States Patent Office 2,903,767
Patented Sept. 15, 1959

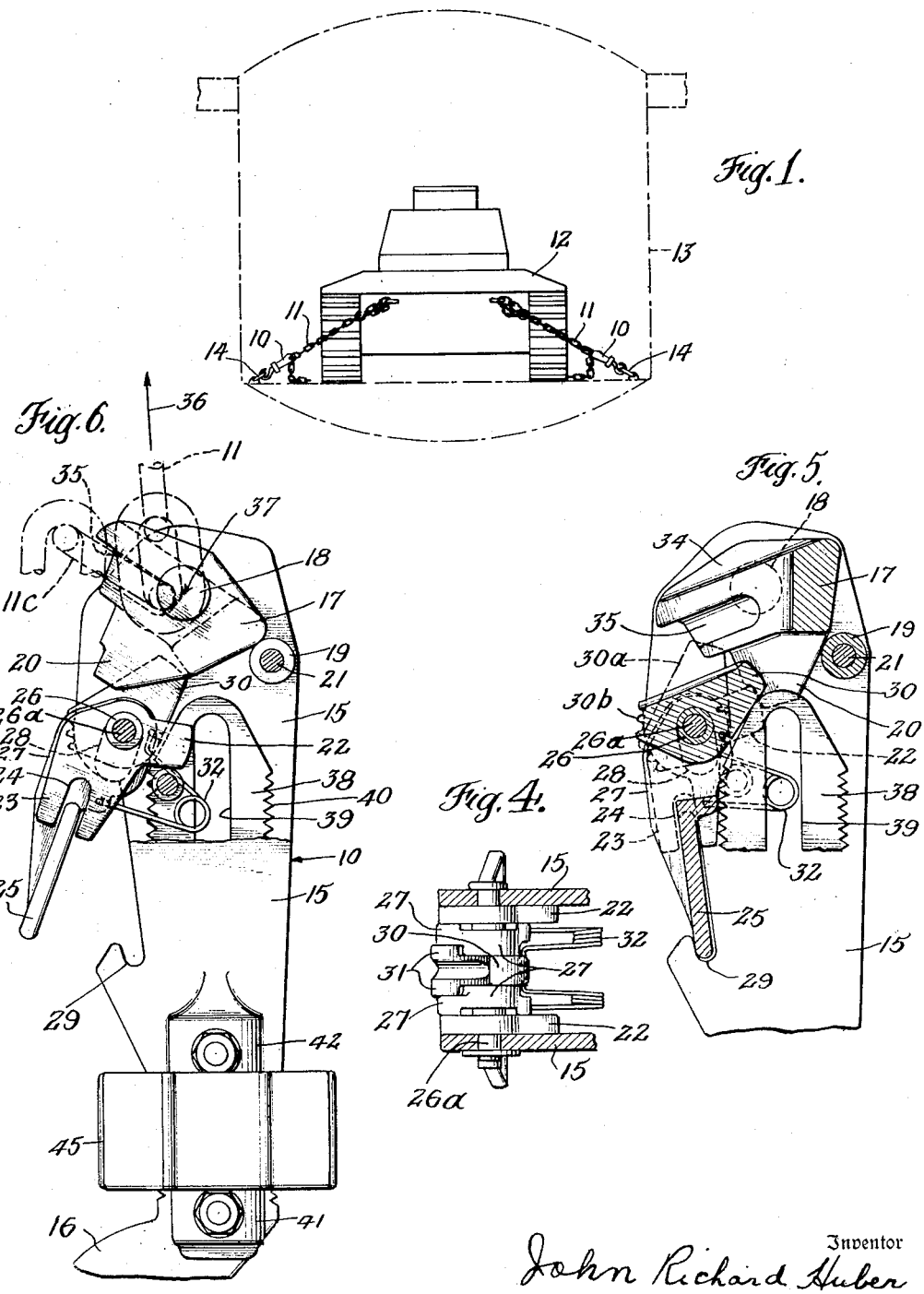

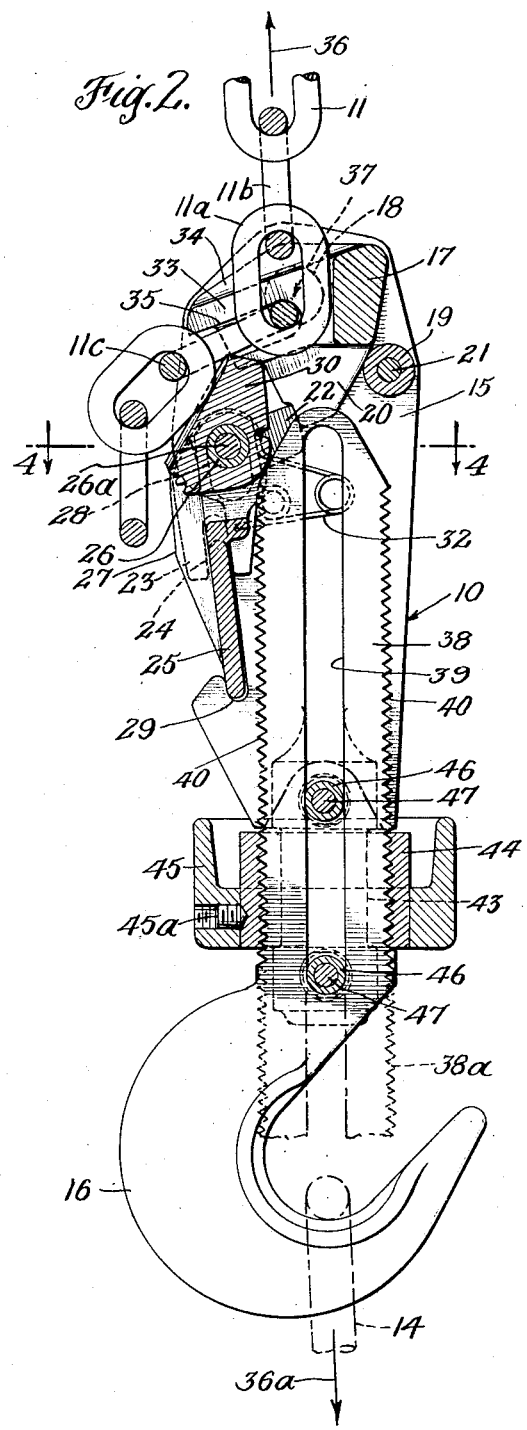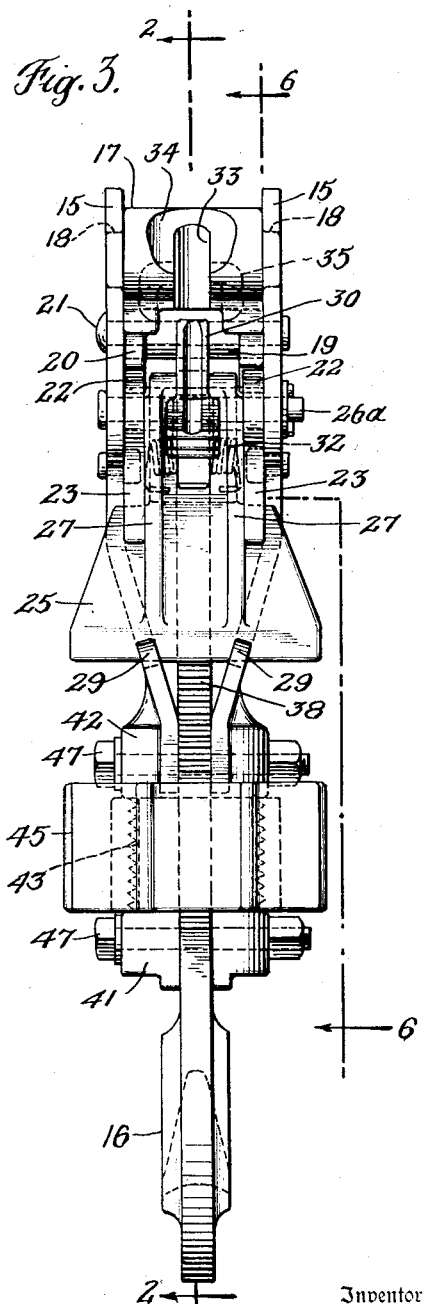

2,903,767

CHAIN SECURING DEVICE WITH TILTING BLOCK

John Richard Huber, Warrington, Pa., assignor to Eastern Rotorcraft Corporation, Doylestown, Pa., a corporation of Pennsylvania Application November 27, 1953, Serial No. 394,773

6 Claims. (Cl. 24—116)

This invention relates to chain engaging and tightening apparatus suitable for use in securing heavy articles such as cargo during shipment.

The apparatus of the present invention is particularly useful in connection with transportation of heavy equipment in aircraft where it is necessary to prevent a shift of position in the aircraft during accelerated movements in flight or in landing and take-off operations. For such purposes, the chain engaging mechanism should be light in weight and at the same time compact so as to permit use in restricted spaces. It is the primary object of this invention to provide an improved chain engaging and tightening device which provides the normal amount of adjustment movement with a mechanism of reduced overall length.

An important feature of the invention is the provision of an improved type of chain link engagement mechanism suitable for transmitting the load from the chain to the anchoring structure and which may at the same time be operated to provide for quick release of the chain when desired, even though the chain may be under load. The chain link engaging mechanism according to the present invention incorporates a block having a suitably shaped pocket and slot to permit the insertion of a link in a generally end-wise direction with the major axis of the holding link making an obtuse angle with respect to the loaded portion of the chain load. The chain link engaging mechanism is particularly useful for use with a high strength, short linked chain where there is insufficient space inside the link to insert a jaw capable of carrying the load. The pocket construction transfers the load by engaging the outer surface of a link.

Another object of the invention is the provision of an improved latch mechanism for holding and controlling the position of the chain engaging block device. The mechanism for accomplishing this project preferably incorporates a pivoted cam portion which may engage the chain engaging block to hold it in loaded position and which may be moved to allow the chain engaging block to shift position for automatic disengagement of the chain. In addition, the latch mechanism includes a separate latch device which allows entry of the chain into the chain block when it is in operating position. This secondary latch is constructed to allow manual removal of the chain link without release of the entire block when so desired.

A further object of the invention is the provision of an improved release handle which is readily accessible and which is located generally alongside the anchoring mechanism frame for protection purposes. In addition the frame structure is suitably shaped to provide for retention of the handle in closed position.

A still further object of the invention is the provision of improved structure for the support of the anchor hook. This improved structure is in the form of shoulder abutment structure integral with the frame members to give relatively greater strength transfer capabilities than has been possible with previous constructions.

How these and other objects and advantages of the invention are accomplished will be evident by reference to the accompanying drawings in which:

Figure 1 is a diagrammatic illustration showing the manner in which the apparatus of the present invention is used.

Figure 2 is a view partly in section taken generally along the line 2—2, Figure 3.

Figure 3 is a front elevational view of the apparatus of Figure 2, the chain being omitted.

Figure 4 is a transverse sectional view taken in the direction of arrows 4—4, Figure 2.

Figure 5 is a view of a portion of the mechanism generally similar to Figure 2, the chain being omitted but with the secondary latch device shown in a different position.

Figure 6 is a partial sectional view taken in the direction of arrows 6—6, Figure 3, showing the chain engaging block and the latch mechanism in released position.

Referring to Figure 1, it will be seen that the chain engaging and adjusting apparatus 10 is attached to the chain 11 which is connected to a heavy piece of equipment 12, such as a bulldozer or tank, as illustrated. The fuselage of the aircraft is indicated by numeral 13 in broken outline. A suitable securing member such as a ring 14, provides for anchoring the adjusting mechanism 10.

The construction of the chain engaging and adjusting mechanism is shown in Figures 2 to 6. Referring first to Figures 2, 3 and 4, it will be observed that the chain 11 is attached at one end of the engaging and tightening apparatus 10 by means of suitable chain engaging parts. Apparatus 10 incorporates two side frame members 15 on which the chain engaging mechanism is supported. At the other end of the frame 15 is mounted the anchor hook 16 adapted to engage to the fixed securing structure 14. The hook 16 is adjustable with respect to the frame 15 in a fashion to be described later.

In order to provide for engagement of the chain to permit transfer of the chain load to the frame members 15, a chain block 17 is mounted between the side frame members 15 by means of trunnions 18. In order to prevent rotation of the chain block 17 about the trunnions 18, a stop 19 is positioned to engage the legs 20 which extend below the main portion of the block 17. Legs 20 are spaced to lie adjacent to the inside surfaces of the frame members 15. A rivet 21, or similar fastening device, passes through the cylindrical stop 19 to retain it in position so that it also acts as a spacer and support for the frame structure. Stop 19 thus limits rotation of the block 17 in a counterclockwise direction as viewed in Figure 2.

To limit clockwise movement of the block 17 a pair of cam legs 22 engage a suitably located surface on block legs 20. The cam legs 22 are made from plate members and lie closely adjacent to the inside of frame members 15 in alignment with the legs 20. Included on each cam part 22 are the extension legs 23, each having a slot 24 which receives the handle member 25. Each cam 22 is supported for pivotal movement about the pivot member 26 which is in the form of a bushing supported between the frame plates 15 by means of pin 26a. The handle 25 is also supported on the pivot 26, extensions 27 attached to handle 25 being provided to engage the pivot. Elongated slots 28 in extensions 27 provide support of the handle 25 on the pivot 26 in a fashion which permits it to slide longitudinally in the direction of the slot. The slot 24 in the legs 23 of the cam members allow the handle to be moved in this direction without altering the position of the cam members 22. Two notches 29, one in the edge of each frame member 15, retain the handle 25 in closed position.

Also supported on the pivot 26 is a secondary latch member 30 which is mounted between the extensions 27 of the handle 25. The latch member 30 may be supported in the position shown in Figure 2 in which it engages a portion of the handle member 25, flanges 31 (Figure 4) being provided to act as stops to prevent counter clockwise rotation beyond the position shown. A spring 32 having one leg engaging the handle 25 and the other leg engaging the latch member 30 applies a resilient pressure to hold the handle 25 in the notch 29 and the latch member 30 in its extended position.

In Figure 2, the chain 11 is shown with link 11a extending through a slot 33 in the block 17. The upper surface of the block 17 is curved to form a depression as indicated in Figures 2 and 3 at 34 to provide clearance for the external link 11b without substantially weakening the block member 17. Underneath the slot 33 the block 17 is hollowed out to provide a pocket 35 which is shaped to accommodate the link 11c which extends end-wise into the pocket, the major axis of the link 11c being at an obtuse angle relative to the loaded part of the chain slightly greater than 90 degrees with the block 17 in closed position. In this position the load from the chain is transmitted from the link 11a to the end portion of the link 11c from which it is transmitted to the upper surface of the pocket 35 to the block 17 and thence through the trunnions 18 in the side frames 15. It should be noted that the line of chain pull as indicated by the arrows 36 and 36a lies slightly to the left of the centerline of rotation 37 of the trunnion 18, thus providing a clockwise moment on the chain block 17 with respect to the pivot 18 when a load is applied to the chain. In the position illustrated in Figure 2 the chain is in operating or loaded position and is held against accidental removal from the pocket 35 since link 11a cannot be removed from the slot 33 because of the restraint offered by latch 30. The chain has been omitted from Figure 3 in order to permit the chain engaging parts to be shown more clearly.

In Figure 5 the chain block 17 is shown in locked operating position as in Figure 2. However, the latch 30 is shown rotated clockwise to release position where the end of the latch is depressed to give adequate clearance to permit insertion or removal of a chain link such as 11a. In Figure 5 the normal position of latch 30 is indicated by dotted outline 30a. The latch 30 may be moved from position 30a to 30 either manually by engaging serrations 30b or automatically as a chain link is being inserted. When the link reaches its engaged position the latch automatically returns to its position 30a to prevent removal of the link, spring 32 producing the return force.

In Figure 6 the handle parts are shown in release position. To reach this position the handle 25 must be slid longitudinally to permit removal from the notch 29. The slots 28 and 24 allow this motion. With the handle clear of the notch 29, the handle may then be rotated in clockwise direction to swing the cam 22 around to a position where it is clear of the cam surfaces on legs 20 of the block 17 so that the block 17 is free to rotate in a clockwise direction to the position illustrated in Figure 6. It will be noted that in this position the pocket 35 in which the retaining link 11c was held has rotated to a position where it makes an acute angle with the line of chain pull 36. The load in the chain 11 actually causes rotation of block 17 to this position upon movement of the handle to the open position. With pocket 35 in the position shown, link 11c is free to disengage from the pocket thereby permitting disengagement of the chain from the engaging mechanism. Stop 19 engages the projection at the side of block 17 when it is in the open position to limit its clockwise travel to the position shown in Figure 6.

In order to provide for length adjustment of the apparatus, hook 16 which is normally attached to the anchor 14 is provided with a shank 38 incorporating a slot 39 and toothed edges 40. To support the hook shank in frame members 15, frame extensions are provided having shoulder parts 41 and 42 with reduced section 43 between them. It will be seen that shoulder parts 41 and 42 are constructed integrally with side plates 15. These shoulder parts are shaped so that before assembly of the parts of the apparatus 10 the frame extensions may be passed through threaded collar 44. After passing through the collar the frame extensions are then spread apart to permit the insertion of shank plate 38. In the spread position shoulders 41 and 42 are proportioned to engage the upper and lower edges of collar 44 to allow rotation but prevent endwise displacement. Cylindrical handle 45 is attached to collar 44 by set screw 45a after which shank 38 may be then inserted through collar 44 by rotating the collar to engage threaded edges 40. When slot 38 has moved beyond the inner end of collar 44 bolts 47 may be passed through shoulder parts 41 and 42 and through spacers 46 to complete the assembly of the hook 16 in the frame. Before tightening bolts 47 the various parts of the chain engaging mechanism may be inserted between frame plates 15 and upon insertion of pin 26a, rivet 21 and bolts 47, assembly of the entire unit is accomplished. This frame construction for the support of the adjustable threaded collar represents an improvement over the frame construction shown in my co-pending application Serial No. 153,618, filed April 3, 1950, and issued as Patent No. 2,715,008 on August 9, 1955.

It will be observed that with the hook in fully retracted position, as shown in Figure 2, some of the parts of the chain engaging mechanism lie along the edge of the shank so that the inner end of the hook shank nestles into the chain engaging assembly. This relationship of parts produces a short unit since only the chain block 17 need extend beyond the shank end. Actually the legs 20 of the chain block 17 extend down to a position beyond the end of the shank 38 to further reduce the overall length of the tightening device.

When using the device, it is normally extended so that the inner end of the slot 39 is in contact with inner bushing 46 which acts as a limit stop for the extended position. This position is shown by dotted outline 38a. The hook is extended by rotation of the collar 44 and hand grip 45. With the chain pocket 17 in the closed position as shown in Figures 2 and 5, and with the grab hook end of the chain attached to the equipment to be secured the chain is then drawn taut by hand and the nearest convenient link is inserted in the pocket 35. While inserting the link 11a into the slot 33, the end of the link depresses the latch 30 to allow it to move into position where it is locked by virtue of the latch 30 moving back to its normal position under the urging of spring 32. Rotation of the hand wheel 45 then causes shortening of the chain engaging apparatus to remove all slack and apply an initial tension in the chain 11.

To release the chain from the load, it is necessary only to release handle 25 from the notch 29 and swing it outwardly to the position shown in Figure 6 thereby permitting the chain load to swing the block 17 to open or release position as shown in Figure 6 when the chain automatically disengages from the pocket 35 under a tension load.

From the foregoing, it will be clear that I have provided a chain engaging and tightening apparatus of simplified construction and improved operation. With this mechanism the operation of attaching and tightening the chain requires only a few seconds. Disengagement of the load occurs automatically upon movement of the release lever. The use of the tumble block construction provides in a single mechanism for load transfer between the chain and the frame and for quick release of the chain under load. The combination latch device further allows manual insertion or removal of the chain by the operator without releasing the tumble block member when such operation is desired during chain adjustment. By providing a flat plate terminal hook construction with the frame shaped to allow disposition of the releasing parts in close proximity to the inner end of the hook shank, a chain releasing and adjusting mechanism having an extremely short length and compact construction is provided.

I claim:

1. A device for connecting to a chain to transfer a load thereto, said device having a frame located generally in line with a loaded chain connected thereto, a block member pivotally supported near one end of said frame, said block member incorporating a flattened oval shaped pocket adapted to engage a chain link disposed generally transverse to the loaded chain, said block member also incorporating a slot connecting with said pocket to accommodate a chain link extended in the direction of the loaded chain, a latch structure pivotally supported on said frame and having a part engaging said block member to retain it in chain connected position and a secondary latch pivotally supported by said frame in position to engage and retain the chain link in said slot.

2. A device constructed according to claim 1 in which a single pivot member supports said latch structure and said secondary latch on said frame.

3. A device for connecting to a chain to transfer load thereto, a frame located generally in line with a loaded chain connected thereto, said frame including a pair of flattened side plate parts, a block member pivotally supported between said side plate parts near one end of said frame, said block member incorporating a pocket adapted to engage a chain link disposed generally transverse to said loaded chain, said transversely disposed link having one end extending outside said pocket, said block member having a slot communicating with said pocket to accommodate a chain link connected to said transversely disposed link and extended in the direction of the loaded chain, a latch structure pivotally supported on said frame and engaging said block member to retain it in chain connected position, said latch structure being movable to disengage said block member to allow it to rotate in a direction wherein said transversely disposed link may move to a position of disengagement with said block member under the chain load, and a cylindrical stop member extending between said side plate parts in a position to contact said block member and limit its movement.

4. A device for connecting to a chain, a frame located generally in line with a loaded chain connected thereto, a block member pivotally supported near one end of said frame, said block member incorporating a pocket shaped to engage a chain link disposed generally transverse to said loaded chain, said pocket being proportioned so that said link has one end in said pocket and the other end extending outside said pocket, said block member having a slot communicating with said pocket to accommodate a chain link connected to the end of said transversely disposed link which is in said pocket, a latch structure supported on said frame and engaging said block member to retain it in loaded chain position, a secondary latch supported on said latch structure in position to engage the chain link in said slot while said block member is retained by said latch structure, said secondary latch being movable independently to disengage the link in said slot.

5. A device constructed according to claim 4 in which said latch structure and said secondary latch are supported on a common pivot member, said secondary latch being movable to disengaged position upon movement of said latch structure.

6. A device for connecting to a chain to transfer a load thereto, said device having a frame located generally in line with a loaded chain connected thereto, a block member pivotally supported near one end of said frame, said block member incorporating a flat oval shaped pocket adapted to engage a chain link disposed generally transverse to the loaded chain, said block member also incorporating a slot connecting with said pocket to accommodate a chain link extending in the direction of the loaded chain, a latch structure pivotally supported on said frame and having a part engaging said block member to retain it in chain connected position and a secondary latch element movably supported by said frame in position to engage and retain a chain link in said slot.

References Cited in the file of this patent

UNITED STATES PATENTS

| 922,929 | Mallon | May 25, 1909 |
| 1,253,455 | Adams | Jan. 15, 1918 |
| 1,384,001 | Splittstoesser | July 5, 1921 |
| 1,963,634 | Stahl | June 19, 1934 |
| 2,302,793 | Mueller | Nov. 24, 1942 |
| 2,499,753 | Hubbard | Mar. 7, 1950 |

FOREIGN PATENTS

| 695,882 | France | Feb. 22, 1950 |